United States Patent
Gossweiler, III et al.

(10) Patent No.: US 9,084,025 B1
(45) Date of Patent: *Jul. 14, 2015

(54) SYSTEM AND METHOD FOR DISPLAYING BOTH MULTIMEDIA EVENTS SEARCH RESULTS AND INTERNET SEARCH RESULTS

(75) Inventors: Richard Carl Gossweiler, III, Sunnyvale, CA (US); Lucy Congyun Zhang, Union City, CA (US); Marisa Belen Louick Bauer, Mountain View, CA (US); Manish Gordhan Patel, Mountain View, CA (US); Maricia Scott, Mountain View, CA (US); Alice Tull, Cupertino, CA (US); Thomas H. Taylor, Redmond, WA (US); Mehran Sahami, Palo Alto, CA (US)

(73) Assignee: GOOGLE INC., Mountain View, CA (US)

( * ) Notice: Subject to any disclaimer, the term of this patent is extended or adjusted under 35 U.S.C. 154(b) by 675 days.

This patent is subject to a terminal disclaimer.

(21) Appl. No.: 11/834,655

(22) Filed: Aug. 6, 2007

(51) Int. Cl.
*G06F 3/00* (2006.01)
*H04N 21/482* (2011.01)
*H04N 21/4782* (2011.01)

(52) U.S. Cl.
CPC ........ *H04N 21/4828* (2013.01); *H04N 21/4782* (2013.01)

(58) Field of Classification Search
CPC .......... H04N 21/4828; H04N 21/4622; H04N 21/4782; H04N 21/4334
USPC ..................................................... 725/53, 56
See application file for complete search history.

(56) References Cited

U.S. PATENT DOCUMENTS

| | | | |
|---|---|---|---|
| 5,319,452 A | 6/1994 | Funahashi | |
| 5,550,576 A | 8/1996 | Klosterman | |
| 5,623,613 A | 4/1997 | Rowe et al. | |
| 5,793,888 A | 8/1998 | Delanoy | |
| 6,005,565 A * | 12/1999 | Legall et al. .................. | 715/721 |

(Continued)

FOREIGN PATENT DOCUMENTS

| | | |
|---|---|---|
| EP | 1126701 A1 | 8/2001 |
| EP | 1387583 A1 | 2/2004 |

(Continued)

OTHER PUBLICATIONS

"Microsoft Computer Dictionary, Fifth Edition," Microsoft Press, 2002.*

(Continued)

*Primary Examiner* — Cheyne D Ly
(74) *Attorney, Agent, or Firm* — Morgan, Lewis & Bockius LLP

(57) ABSTRACT

A system and method for presenting search results, including receiving a set of search results corresponding to a search query. The search results include: first results and second results. The first result corresponds to one or more time-bounded events, scheduled for showing on one or more television channels, that match the search query, and include links to an online application for accessing additional information about the one or more time-bounded events. The second results correspond to Internet accessible documents that satisfy the search query, and include links to the Internet accessible documents that satisfy the search query. The method also includes presenting the first and second results in a single web browser window.

10 Claims, 11 Drawing Sheets

(56) References Cited

U.S. PATENT DOCUMENTS

| | | | |
|---|---|---|---|
| 6,025,837 A * | 2/2000 | Matthews et al. | 715/721 |
| 6,034,677 A | 3/2000 | Noguchi et al. | |
| 6,034,683 A | 3/2000 | Mansour et al. | |
| 6,064,062 A | 5/2000 | Bohn | |
| 6,128,009 A | 10/2000 | Ohkura et al. | |
| 6,177,931 B1 | 1/2001 | Alexander et al. | |
| 6,184,878 B1 | 2/2001 | Alonso et al. | |
| 6,222,540 B1 | 4/2001 | Sacerdoti | |
| 6,240,555 B1 | 5/2001 | Shoff et al. | |
| 6,275,229 B1 | 8/2001 | Weiner et al. | |
| 6,289,170 B1 | 9/2001 | Nagano et al. | |
| 6,301,579 B1 | 10/2001 | Becker | |
| 6,357,043 B1 | 3/2002 | Ellis et al. | |
| 6,499,138 B1 | 12/2002 | Swix et al. | |
| 6,600,501 B1 | 7/2003 | Israel et al. | |
| 6,690,391 B1 | 2/2004 | Proehl et al. | |
| 6,707,454 B1 | 3/2004 | Barg et al. | |
| 6,742,184 B1 | 5/2004 | Finseth et al. | |
| 6,756,997 B1 | 6/2004 | Ward et al. | |
| 6,769,128 B1 | 7/2004 | Knee et al. | |
| 6,839,705 B1 * | 1/2005 | Grooters | 1/1 |
| 6,943,793 B2 | 9/2005 | Bowser et al. | |
| 6,950,989 B2 | 9/2005 | Rosenzweig et al. | |
| 6,983,478 B1 | 1/2006 | Grauch et al. | |
| 6,996,782 B2 | 2/2006 | Parker et al. | |
| 7,013,478 B1 | 3/2006 | Hendricks et al. | |
| 7,079,142 B2 | 7/2006 | Chiu et al. | |
| 7,188,156 B2 | 3/2007 | Bertram et al. | |
| 7,325,198 B2 | 1/2008 | Adcock et al. | |
| 7,373,652 B1 | 5/2008 | Bayrakeri et al. | |
| 7,404,150 B2 | 7/2008 | Clark et al. | |
| 7,421,421 B2 | 9/2008 | Newbold et al. | |
| 7,454,777 B1 | 11/2008 | Nishikawa et al. | |
| 7,493,303 B2 | 2/2009 | Newbold et al. | |
| 7,505,038 B2 | 3/2009 | Bell et al. | |
| 7,552,459 B2 | 6/2009 | Klosterman et al. | |
| 7,606,819 B2 | 10/2009 | Audet et al. | |
| 7,694,236 B2 | 4/2010 | Gusmorino et al. | |
| 7,698,657 B2 | 4/2010 | Gemmell et al. | |
| 7,788,080 B2 | 8/2010 | Graham et al. | |
| 7,788,592 B2 | 8/2010 | Williams et al. | |
| 7,800,615 B2 | 9/2010 | MacPherson | |
| 7,801,784 B2 | 9/2010 | Bandman et al. | |
| 7,831,601 B2 | 11/2010 | Oral et al. | |
| 7,835,543 B2 | 11/2010 | Yoshinaga et al. | |
| 7,890,490 B1 | 2/2011 | Bovenschulte et al. | |
| 7,937,309 B2 | 5/2011 | Bandman et al. | |
| 7,944,445 B1 | 5/2011 | Schorr et al. | |
| 8,010,579 B2 | 8/2011 | Metsatahti et al. | |
| 8,019,155 B2 | 9/2011 | Hibino et al. | |
| 8,078,603 B1 | 12/2011 | Chandratillake et al. | |
| 2001/0011373 A1 | 8/2001 | Inoue | |
| 2002/0042916 A1 | 4/2002 | Mineyama | |
| 2002/0044144 A1 | 4/2002 | Inoue | |
| 2002/0052864 A1 | 5/2002 | Yamamoto | |
| 2002/0067379 A1 | 6/2002 | Kenyon et al. | |
| 2002/0073424 A1 | 6/2002 | Ward, III et al. | |
| 2002/0112237 A1 | 8/2002 | Kelts | |
| 2002/0129368 A1 | 9/2002 | Schlack et al. | |
| 2002/0129376 A1 | 9/2002 | Kitsukawa et al. | |
| 2003/0033296 A1 | 2/2003 | Rothmuller et al. | |
| 2003/0038831 A1 | 2/2003 | Engelfriet | |
| 2003/0113040 A1 | 6/2003 | Nishiyama et al. | |
| 2003/0118087 A1 | 6/2003 | Goldthwaite et al. | |
| 2003/0120373 A1 | 6/2003 | Eames | |
| 2003/0126600 A1 | 7/2003 | Heuvelman | |
| 2003/0149988 A1 | 8/2003 | Ellis et al. | |
| 2004/0002987 A1 | 1/2004 | Clancy et al. | |
| 2004/0004617 A1 | 1/2004 | Street et al. | |
| 2004/0031058 A1 | 2/2004 | Reisman | |
| 2004/0059996 A1 | 3/2004 | Fasciano | |
| 2004/0095376 A1 | 5/2004 | Graham et al. | |
| 2004/0125137 A1 | 7/2004 | Stata et al. | |
| 2004/0154040 A1 | 8/2004 | Ellis | |
| 2004/0255296 A1 | 12/2004 | Schmidt et al. | |
| 2004/0267897 A1 | 12/2004 | Hill et al. | |
| 2005/0057566 A1 | 3/2005 | Githens et al. | |
| 2005/0071323 A1 | 3/2005 | Gabriel et al. | |
| 2005/0076092 A1 | 4/2005 | Chang et al. | |
| 2005/0076361 A1 | 4/2005 | Choi et al. | |
| 2005/0086207 A1 | 4/2005 | Heuer et al. | |
| 2005/0091596 A1 | 4/2005 | Anthony et al. | |
| 2005/0102634 A1 | 5/2005 | Sloo | |
| 2005/0108253 A1 | 5/2005 | Metsatahti et al. | |
| 2005/0134945 A1 | 6/2005 | Gallagher | |
| 2005/0144190 A1 | 6/2005 | Wada | |
| 2005/0172315 A1 | 8/2005 | Chen | |
| 2005/0210145 A1 | 9/2005 | Kim et al. | |
| 2005/0228735 A1 | 10/2005 | Duquette | |
| 2005/0235321 A1 | 10/2005 | Ahmad-Taylor | |
| 2005/0273833 A1 | 12/2005 | Soinio | |
| 2005/0278737 A1 | 12/2005 | Ma et al. | |
| 2005/0278741 A1 | 12/2005 | Robarts et al. | |
| 2005/0289142 A1 | 12/2005 | Adams, Jr. | |
| 2006/0020962 A1 | 1/2006 | Stark et al. | |
| 2006/0031199 A1 | 2/2006 | Newbold et al. | |
| 2006/0036639 A1 | 2/2006 | Bauerle et al. | |
| 2006/0064716 A1 | 3/2006 | Sull et al. | |
| 2006/0146436 A1 | 7/2006 | Goodwin et al. | |
| 2006/0155757 A1 | 7/2006 | Williams et al. | |
| 2006/0156237 A1 | 7/2006 | Williams et al. | |
| 2006/0156246 A1 | 7/2006 | Williams et al. | |
| 2006/0173824 A1 | 8/2006 | Bensky et al. | |
| 2006/0174269 A1 | 8/2006 | Hansen-Turton | |
| 2006/0195428 A1 | 8/2006 | Peckover | |
| 2006/0253869 A1 | 11/2006 | Boyer et al. | |
| 2007/0005563 A1 | 1/2007 | Aravamudan et al. | |
| 2007/0033169 A1 | 2/2007 | Friedman | |
| 2007/0073894 A1 | 3/2007 | Erickson et al. | |
| 2007/0083522 A1 | 4/2007 | Nord et al. | |
| 2007/0106693 A1 | 5/2007 | Houh et al. | |
| 2007/0107019 A1 | 5/2007 | Romano et al. | |
| 2007/0112578 A1 | 5/2007 | Randle et al. | |
| 2007/0118852 A1 | 5/2007 | Calderwood | |
| 2007/0157222 A1 | 7/2007 | Cordray et al. | |
| 2007/0157232 A1 | 7/2007 | Dunton et al. | |
| 2007/0250855 A1 | 10/2007 | Quinn-Jacobs et al. | |
| 2008/0022310 A1 | 1/2008 | Poling et al. | |
| 2008/0082578 A1 | 4/2008 | Hogue et al. | |
| 2008/0086688 A1 | 4/2008 | Chandratillake et al. | |
| 2008/0104058 A1 | 5/2008 | Billmaier et al. | |
| 2008/0104529 A1 | 5/2008 | Cravens et al. | |
| 2008/0201740 A1 | 8/2008 | Boyer et al. | |
| 2008/0240560 A1 | 10/2008 | Hibino et al. | |
| 2008/0270449 A1 * | 10/2008 | Gossweiler et al. | 707/102 |
| 2008/0282291 A1 * | 11/2008 | Henty | 725/44 |
| 2009/0033664 A1 | 2/2009 | Hao et al. | |
| 2010/0031193 A1 | 2/2010 | Stark et al. | |
| 2010/0121714 A1 * | 5/2010 | Bovenschulte et al. | 705/14.55 |
| 2010/0135643 A1 | 6/2010 | Fleming | |
| 2010/0257561 A1 | 10/2010 | Maissel et al. | |

FOREIGN PATENT DOCUMENTS

| | | |
|---|---|---|
| JP | 2003-032568 | 1/2003 |
| WO | WO 2005/101842 A1 | 10/2005 |

OTHER PUBLICATIONS

Google Inc., Communication pursuant to Article 94(3) EPC, EP 07865892.9, Oct. 14, 2009, 4 pgs.

Google Inc., International Search Report / Written Opinion, PCT/US2007/088246, Apr. 3, 2008, 8 pgs.

Google Inc., International Search Report / Written Opinion, PCT/US2008/061307, Sep. 4, 2008, 9 pgs.

Google Inc., Office Action, CN 200780051900.7, Mar. 20, 2012, 4 pgs.

Google Inc., Office Action, CN 200780051900.7, Oct. 23, 2012, 5 pgs.

Google Inc., Office Action, CN 200780051900.7, Mar. 24, 2011, 6 pgs.

Google Inc., Office Action, JP 2009-544203, Aug. 22, 2012, 3 pgs.

* cited by examiner

SYSTEM AND METHOD FOR DISPLAYING BOTH MULTIMEDIA EVENTS SEARCH RESULTS AND INTERNET SEARCH RESULTS

TECHNICAL FIELD

The disclosed embodiments relate generally to the presentation of multimedia events scheduling information, and in particular, to a system and method of searching and presenting results related to multimedia events scheduling information.

BACKGROUND

Internet search engines allow users to search for and find an abundance of information related to virtually any topic. Typically, a user submits a search query using key terms and the search engine returns various search results matching that search query. The search results are produced and displayed according to various criteria that the search engine developer has created. Often, the search results encompass a wide variety of documents and are not categorized according to any particular criteria.

For example, when a user conducts a search on a general search engine for a favorite television show by entering the title of the television show as the search query, the search results produced may not necessarily match the television show searched for, and may include other results with words or terms matching the words in the television show title.

SUMMARY

In accordance with some embodiments of the present invention, a method of presenting search results includes receiving a set of search results corresponding to a search query. The search results include: first results and second results. The first result corresponds to one or more time-bounded events, scheduled for showing on one or more television channels, that match the search query, and include links to an online application for accessing additional information about the one or more time-bounded events. The second results correspond to Internet accessible documents that satisfy the search query, and include links to the Internet accessible documents that satisfy the search query. In some embodiments, the method also includes presenting the first and second results in a single web browser window.

In accordance with some embodiments of the present invention, a system for presenting search results includes memory, one or more processors, and one or more modules stored in memory and configured for execution by the one or more processors. The one or more modules include instructions for receiving a set of search results corresponding to a search query, wherein the search results include first results and second results. Each first result corresponds to one or more time-bounded events scheduled for showing on one or more television channels, that match the search query, and includes links to an online application for accessing additional information about the one or more time-bounded events. The second results correspond to Internet accessible documents that satisfy the search query, and including links to the Internet accessible documents that satisfy the search query. In some embodiments, the one or more modules also include instructions for presenting the first and second results in a single web browser window, where the first results are presented in a continuous sub-region of the web browser window and are presented in manner that is visually distinguished from the second results.

In accordance with some embodiments of the present invention, a computer readable storage medium stores one or more programs, the one or more programs including instructions for receiving a set of search results corresponding to a search query, wherein the search results include first results and second results. Each first result corresponds to one or more time-bounded events scheduled for showing on one or more television channels, that match the search query, and includes links to an online application for accessing additional information about the one or more time-bounded events. The second results correspond to Internet accessible documents that satisfy the search query, and include links to the Internet accessible documents that satisfy the search query. In some embodiments, the computer readable storage medium also includes instructions for presenting the first and second results in a single web browser window, where the first results are presented in a continuous sub-region of the web browser window and are presented in manner that is visually distinguished from the second results.

In accordance with some embodiments of the present invention, a computer implemented method of presenting search results includes receiving from a client a search query, searching a primary database to generate a primary set of search results, comparing the search query against one or more lists of keywords associated with a secondary database, and when the comparison meets predefined criteria, searching the secondary database to generate a secondary set of search results. The secondary set of search results correspond to one or more time-bounded events, scheduled for showing on one or more television channels, that match the search query, and include links to an online application for accessing additional information about the one or more time-bounded events. The method of presenting search results also includes sending at least a subset of the primary set of search results and the secondary set of search results to the client.

BRIEF DESCRIPTION OF THE DRAWINGS

Like reference numerals refer to corresponding parts throughout the drawings.

DETAILED DESCRIPTION OF THE INVENTION

Figure 1:
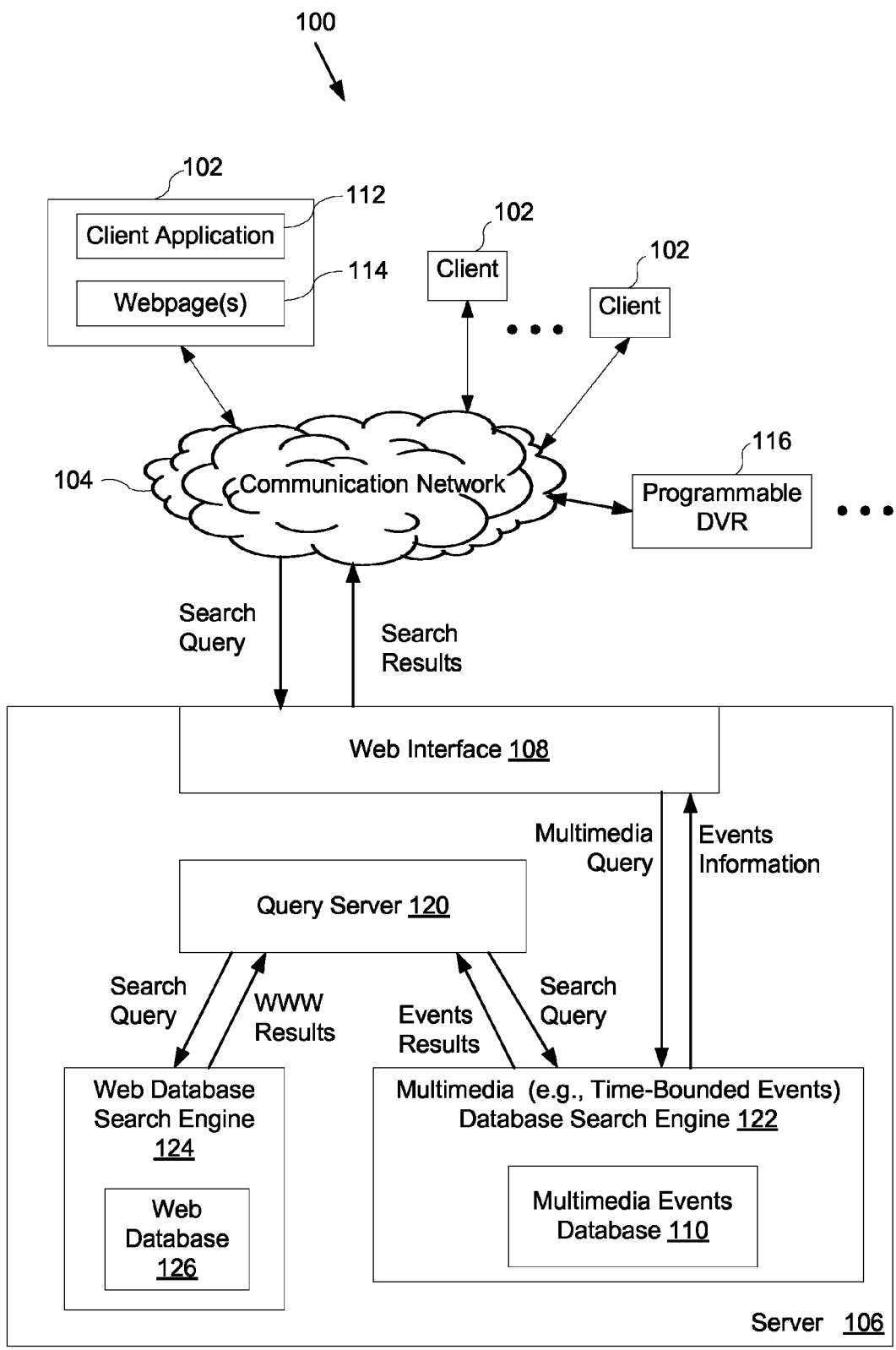
FIG. 1 is a block diagram of a system for implementing some embodiments of the present invention.

FIG. 1 is a block diagram of a system for implementing some embodiments of the present invention. One or more client computers or devices 102 (hereinafter "clients") and a server 106 are connected to a communication network 104. Optionally, one or more programmable digital video recorders (DVRs) 116 are also connected to the communication network 104. The clients 102, server 106 and optionally the DVRs 116 are interconnected by the communication network 104.

The server 106 may include a web interface 108, a query server 120, a web database search engine 124 and a multimedia database search engine 122. In some embodiments, the web database search engine 124 is also known as a primary search engine and the multimedia database search engine 122 is known as a secondary search engine.

The web interface 108 facilitates communication between the server 106 and the communication network 104. The web interface 108 allows for the transfer of information from the server 106 to the communication network 104 to be displayed on a client application 112 of a client 102. The web database search engine 124 receives search queries from query server 120 and sends web results to the query server 120. The web database search engine 124 includes a web database 126, which stores information associated with information available on the World Wide Web. The multimedia events database search engine 122 also receives search queries from the query server 120 and sends events results to the query server 120. The multimedia events database search engine 122 includes a multimedia events database 110, which stores information associated with multimedia events. In some embodiments, the multimedia events database 110 may be known as a secondary database. In some embodiments, these events may be time-bounded events, such as television shows scheduled for broadcast on a particular day.

The multimedia database search engine 122 also serves as an online application, which services client requests (which may be called multimedia queries) for information about multimedia events. As discussed below, the multimedia database search engine 122 may store user preferences information, such as information on their favorite channels, virtual channels defined by the users, their zip code and preferred television provider (sometimes called a head end), and so on.

The client 102 may be any of a number of devices (e.g. a computer, an internet kiosk, a personal digital assistant, a cell phone, a desktop computer, or a laptop computer) and can include a client application 112 that permits a user to view web pages 114 or other documents or information. The client application 112 may be a software application that permits a user to interact with the client 102 and/or network resources to perform one or more tasks. For example, the client application 112 may be a web browser (e.g., Firefox, Internet Explorer or Safari) or other type of application that permits a user to search for, browse, and/or use resources, such as one or more web pages 114, on the client 102 and/or accessible via the communication network 104.

The communication network 104 may be a local area network (LAN), a metropolitan area network, a wide area network (WAN), such as an intranet, an extranet, or the Internet, or any combination of such networks. It is sufficient that the communication network 104 provides communication capability between the clients 102 and the server 106. In some embodiments, the communication network 104 uses Hyper-Text Transport Protocol (HTTP) to transport information using the Transmission Control Protocol/Internet Protocol (TCP/IP). The HTTP permits client computers to access various resources available via the communication network 104. The various embodiments of the invention, however, are not limited to the use of any particular protocol. The term "resource" as used throughout this specification refers to any document, object, information item, set of information, or service that is accessible via a Uniform Resource Locator (URL) and can be, for example, a web page, a text or word processing document, an email message, a transcribed voice message, a database, an image, or a computational object.

Figure 2A:
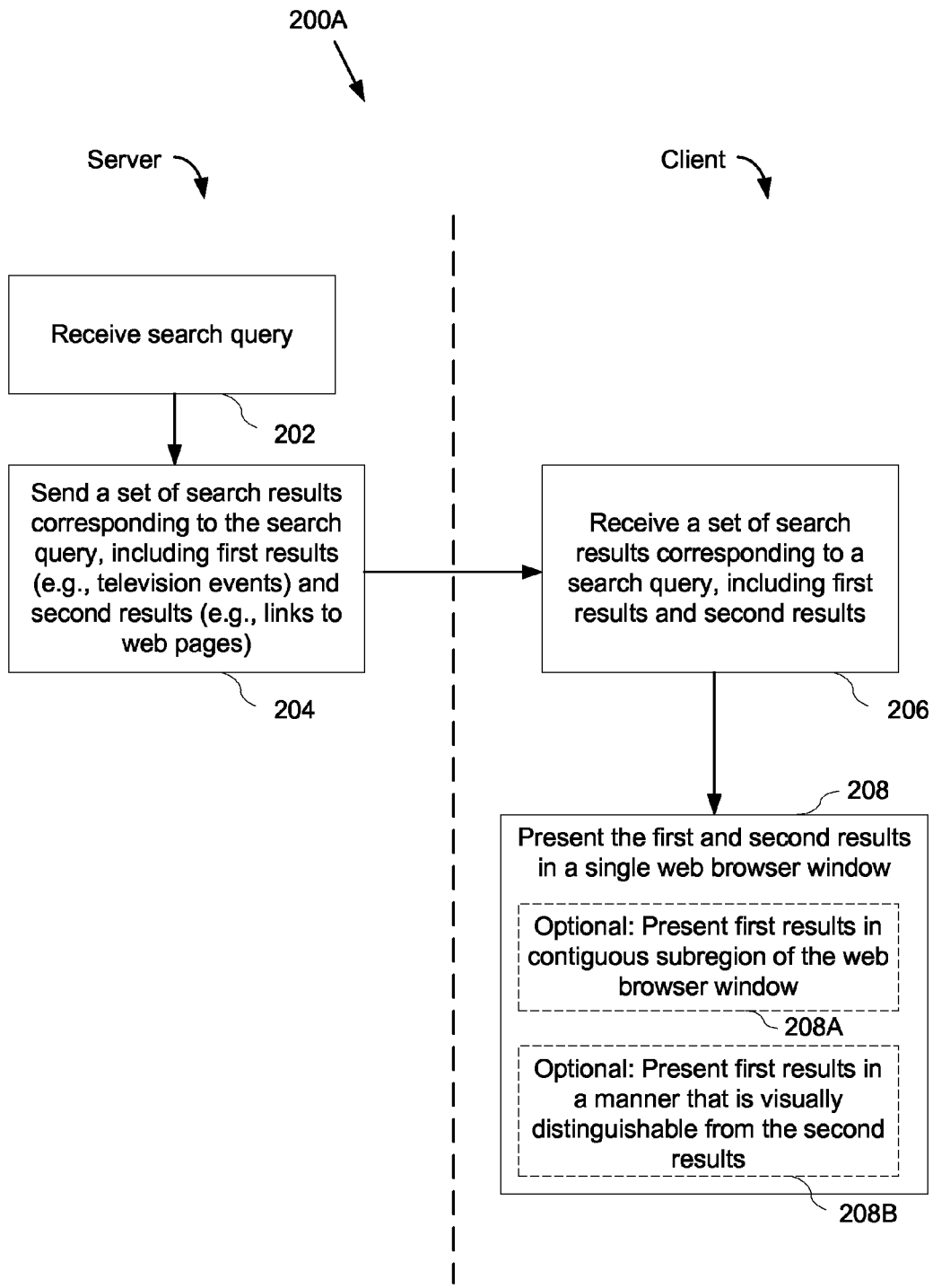
FIGS. 2A and 2B are flow diagrams of processes for presenting search results according to some embodiments of the present invention.

FIG. 2A is a flow diagram of a process 200 for presenting search results according to an embodiment of the present invention. The process 200A occurs at a client device, on a client application that permits a user to view web pages or other documents or information. The process 200 begins when a server receives a search query (202). The search query is typically inputted by a user of a client device. The server processes the search query and sends a set of search results corresponding to the search query (204). The search results include first results and second results. The first results may be, for example, television events. The second results may be, for example, links to web pages, which correspond to the search query.

Figure 4A:
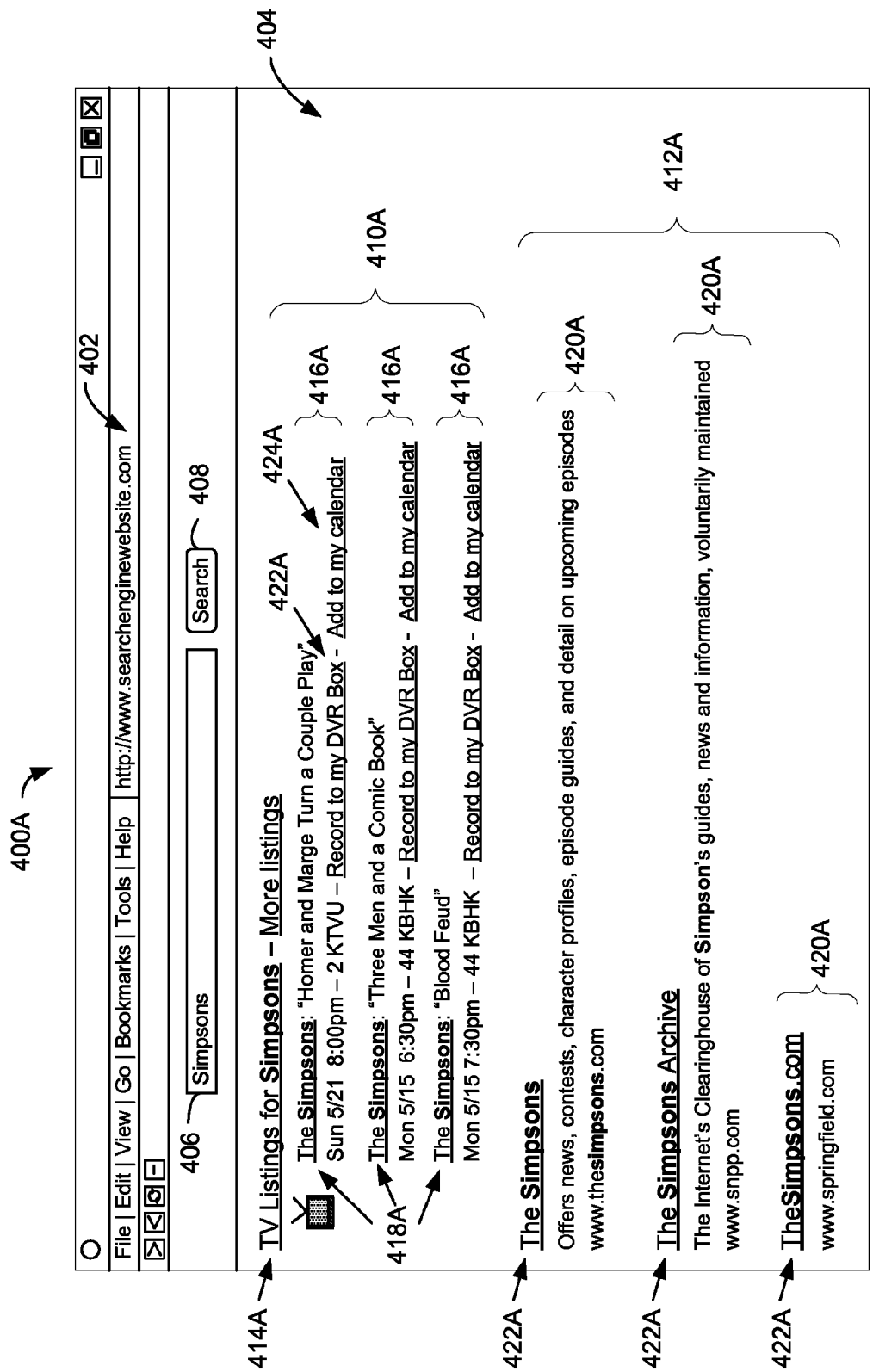
FIG. 4A is a schematic screenshot of a web browser presenting search results according to one embodiment of the present invention.

A client 102 receives the set of search results, including first results and second results (see, for example, first results 410A and second results 412A in FIG. 4A), corresponding to the search query (206). The client then presents the first and second results (208) in a single web browser window. In some embodiments, the first results are presented in a continuous subregion (sometimes called a "OneBox" or "One Box") of a single web browser window (208A). In other embodiments, the first results are presented in a manner that is visually distinguishable from the second results (208B). For example, in some embodiments, the first and second results are displayed in a list, and the first results are displayed above the second results on the list. In some embodiments, the second results are displayed in a second region of the web browser window that excludes the contiguous sub-region of the web browser window in which the first results are displayed.

Figure 2B:
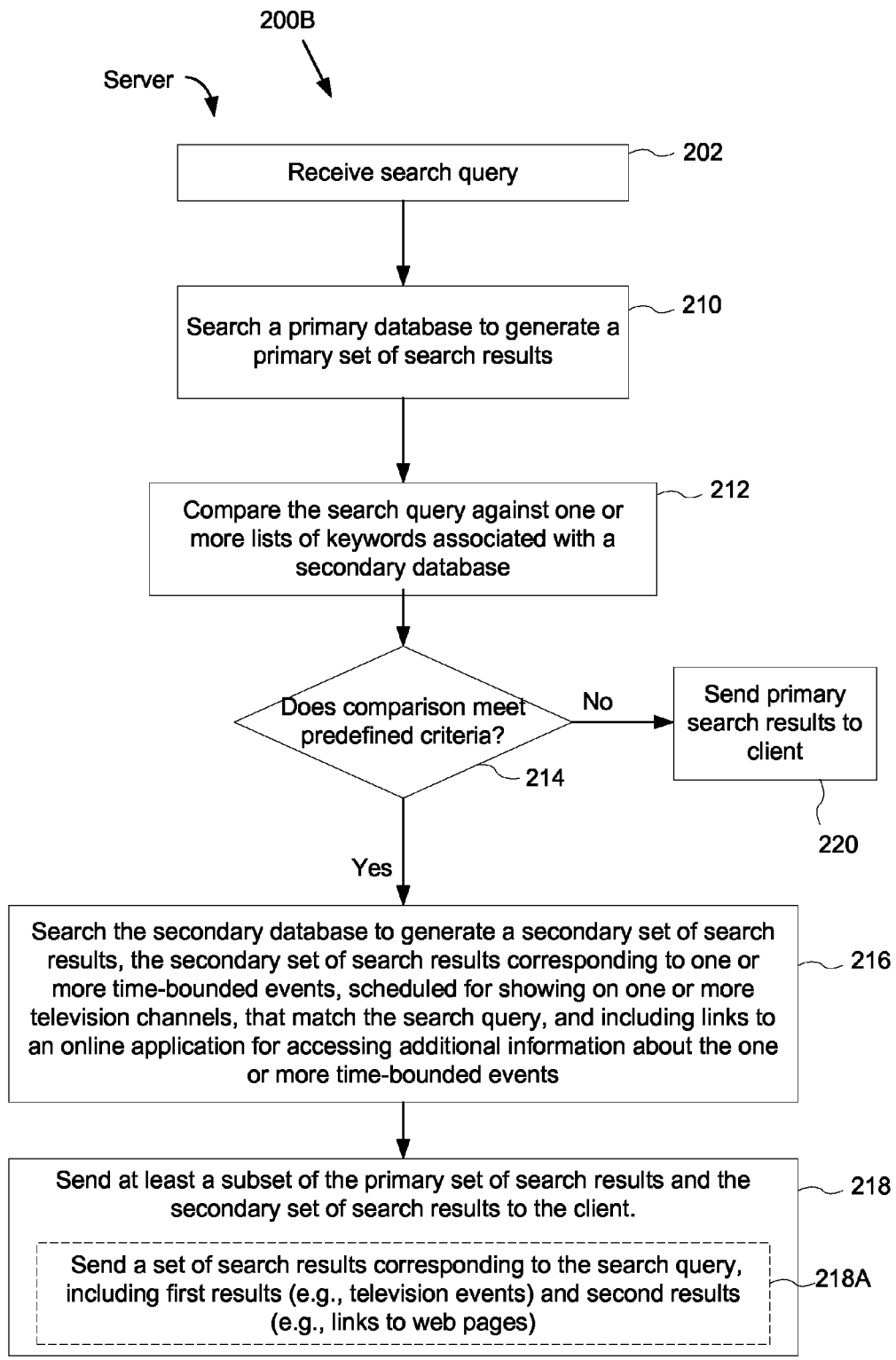

FIG. 2B is a flow diagram of a process 200B for generating search results and sending at least a subset of the search results to a client, according to another embodiment of the present invention. The process 200B occurs at a server. The process 200B begins when a server receives a search query (202). For example, the search query may be input by a user of a client device, which transmits the search query to the server via the communication network 104 (FIG. 1). The server processes the search query by searching a primary database to generate a primary set of search results (210). The search query is also compared against one or more lists of keywords associated with a secondary database (212). If the comparison does not meet predefined criteria (214-No), only the primary database is searched (using the search query) to generate a primary set of search results (210), and the primary set of search results are sent to a client device (220). If the comparison does meet predefined criteria (214-Yes), a secondary database is searched (using the search query) to generate a secondary set of search results (216). The secondary set of search results correspond to one or more time-bounded events, scheduled for showing on one or more television channels, that match the search query, and include links to an online application for accessing additional information. The additional information may include additional search results (e.g., information for one or more events not included in the secondary set of search results) and/or may include additional information about the one or more time-bounded events in the secondary set of search results. At least a subset of the primary set of search results (e.g., links to web pages) and the secondary set of search results (e.g., listings of television events) is sent to the client (218).

The secondary set of search results are sometimes herein called "first results," and the primary set of search results are sometimes herein called "second results." This is the case, for example, in the description of the method shown in FIG. 2B, below. In addition, looking ahead at FIG. 4A, it can be seen that in some embodiments the first results (when there are any first results) are displayed above the second results. Thus, the "secondary set of search results" (when there are any) may be displayed more prominently than the "primary set of search results."

Similar to the process 200A described above, the client 102 receives the set of search results, including first results and second results, corresponding to the search query 206. The client then presents the first and second results 208 in a single web browser window. In some embodiments, the first results are presented in a continuous subregion (e.g., television listings displayed in a "OneBox") of a single web browser window 208A. In other embodiments, the first results are presented in a manner that is visually distinguishable from the second results 208B. For example, in some embodiments, the first and second results are displayed in a list, and the first results are displayed above the second results on the list.

Figure 2C:
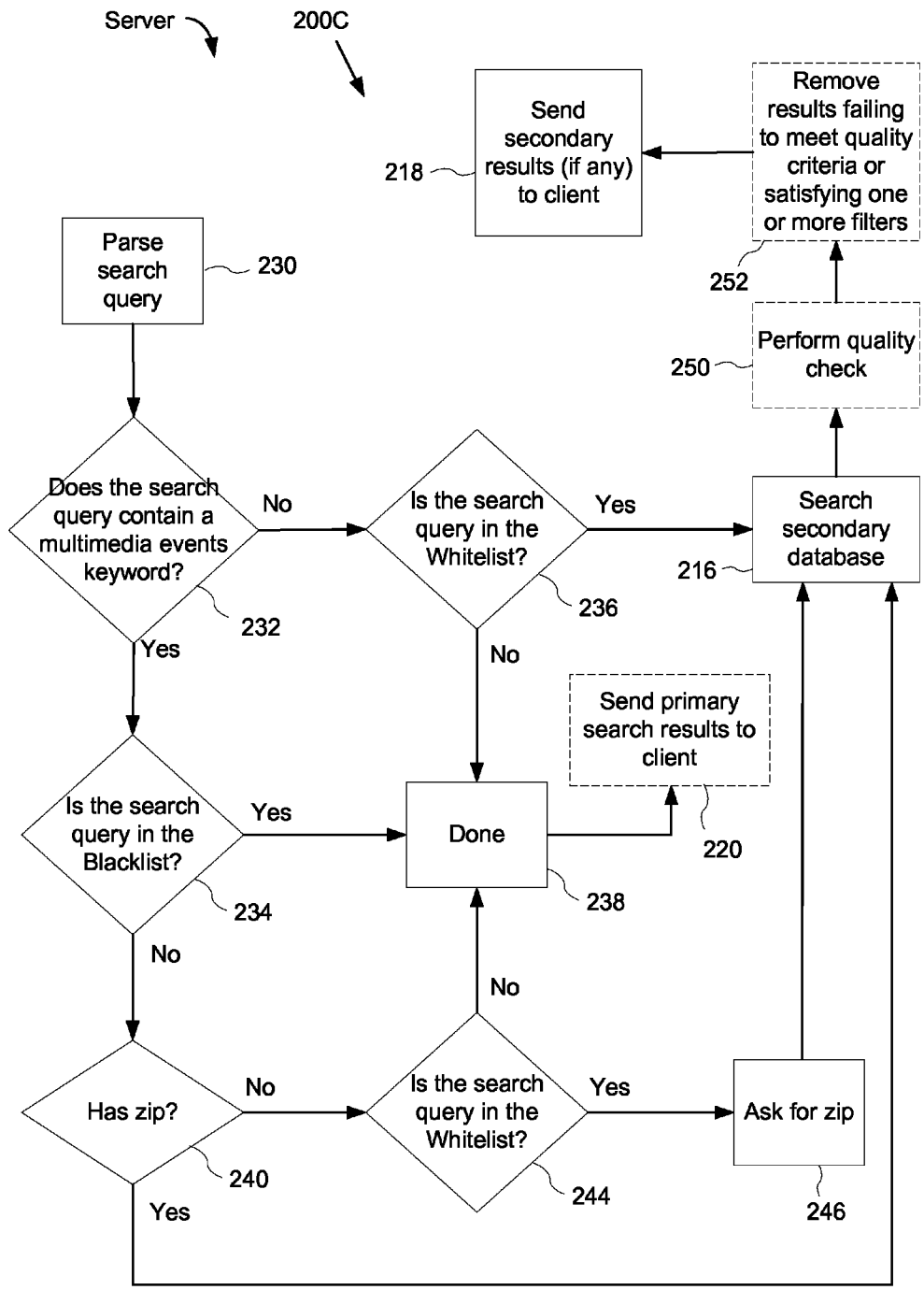
FIG. 2C is a flow diagram of a process for processing search queries in accordance with some embodiments of the present invention.

FIG. 2C is a flow diagram of a process 200C for processing search queries in accordance with some embodiments of the present invention. The process 200C occurs at a server during inquiry 214 (FIG. 2B) in order to determine whether the comparison of the search query meets a predefined criteria. The search query is parsed (230) and a determination is made regarding whether the search query contains a multimedia keyword in one or more lists of multimedia events keywords (232). In some embodiments, examples of multimedia events keywords may include "television," "tv," "video," "HBO," "ABC," and other terms that are highly indicative of a search for one or more multimedia events.

In some embodiments, the one or more lists of multimedia keywords includes a first list of terms (sometimes herein called a Whitelist) associated with titles of a subset of the time-bounded events in the secondary database. In some other embodiments, the one or more lists of multimedia keywords also includes a second list of terms (sometimes herein called a Blacklist). When at least a portion of the search query matches an item (e.g., "flat screen TV") in the second list, this indicates that the secondary database should not be searched using the search query, in which case only search results from the primary database will be returned to the user. From the viewpoint of inquiry 214 (FIG. 2B), when a term or phrase in the search query matches any item in the second list (Blacklist), the comparison (212) does not meet the predefined criteria (214-No).

Returning to our description of FIG. 2C, if the search query contains a multimedia events keyword (232-Yes), a determination is made as to whether the query contains one or more terms or phrases in a Blacklist (234). If the search query does not contain a multimedia events keyword (232-No), a determination is made as to whether the query contains one or more terms or phrases in a Whitelist (236).

In some embodiments, the Whitelist is a list of terms or phrases that indicate that the search query is a query for results associated with multimedia events. Therefore, if the search query does not contain any multimedia events keywords (232-No) and does not have any terms or phrases that match terms or phrases in the Whitelist (236-No), then the analysis of the search query is complete (238) and the primary search results are sent to the client (220, FIG. 2B). In other words, in this circumstance, the search query is not sent to the secondary (multimedia events) database. However, if the search query does include at least one term or phrase found in the Whitelist (236-Yes), the query is sent to the backend (248) to determine which multimedia event results match the search query in order to produce a secondary set of search results corresponding to one or more time-bounded events, or multimedia events.

For example, a word or phrase in the Whitelist may be a name of a popular television show. Therefore, when a user includes such a word or phrase in a search query, there is a high probability that the user is looking to receive search results corresponding to the television show.

In some embodiments, a Blacklist is a list of terms or phrases that indicate that the search query does not correspond to a query for multimedia events, and therefore, if the query is in the Blacklist (234-Yes), then the analysis of the term is complete (238) and the primary search results are sent to the client (220, FIG. 2B). Thus, secondary search results from the multimedia events database are not produced and sent to the client. However, if the search query is not in the Blacklist (234-No), a determination is made as to whether the query has a zip code associated with it (240). If there is a zip code associated with the query (240-Yes), then the query is sent to the backend (248) to determine which multimedia events search results match the search query in order to produce the secondary set of search results corresponding to one or more time-bounded events, or multimedia events. If there is no zip code associated with the search query (240-No), a determination is made as to whether the search query contains one or more terms or phrases in the Whitelist (244). If the search query does not contain any terms or phrases in the Whitelist (244-No), the analysis of the term is complete (238) and the primary search results are sent to the client (220, FIG. 2B).

If the search query is found in the Whitelist, (244-Yes), the server sends a message to the client to ask the user for a zip code (246) and then the search query is sent to the backend (216) to search the secondary database for multimedia events that match the search query. The search produces a secondary set of search results corresponding to one or more time-bounded events, or multimedia events.

Optionally, a quality check is performed on the search results (250). In some embodiments, the secondary set of search results are not sent to the client when a quality score associated with the secondary set of search results fails to meet predefined quality criteria (252). In some other embodiments, search results that satisfy one or more filters are excluded from the secondary set of search results (252). The resulting secondary set of search results, if any, are sent to the client (218) along with the primary search results (if any).

In some embodiments, process 200C (excluding operations 216, 218, 250, and 252) is performed at server 106. In some other embodiments, process 200C may be performed at multimedia database search engine 122. In yet other embodiments, portions (e.g., operation 230) of process 200C are performed at server 106 while other portions (e.g., all operations other than 230) are performed at multimedia database search engine 122.

Figure 3:
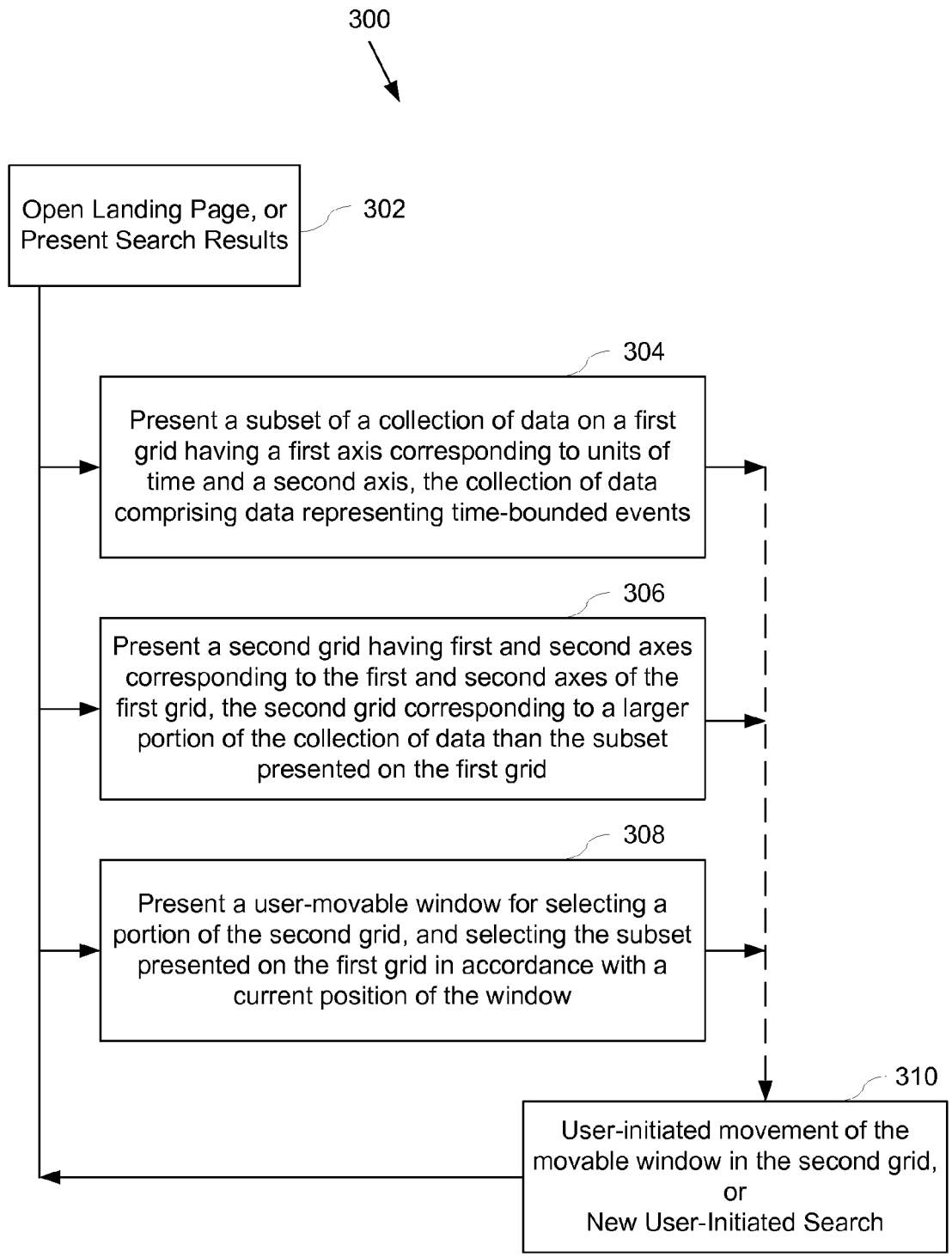
FIG. 3 is a flow diagram of a process for presenting search results according to an embodiment of the present invention.

FIG. 3 is a flow diagram of a process 300 for presenting a collection of data according to an embodiment of the present invention. Process 300 occurs at a client device, using a client application that permits a user to view web pages or other documents or information. The process 300 begins by a user-initiated action on the client application, which results in an opening of a "landing page" or a presentation of search results (302). In some embodiments, a user may select a first result that is presented as a result of the process outlined in the description above for FIG. 2, to cause the display of the "landing page" or presentation of search results (302). As another example, the user may enter a particular Uniform Resource Locator (URL) for a specific web page, which results in the opening of a landing page. A landing page is typically the home page or an entryway page for an online service, also called an online application. As yet another example, the user may enter a search query into an online search engine, such as the Google search engine, which results in the presentation of search results.

The process 300 may comprise operations that occur simultaneously, or during overlapping time periods. One of these operations steps is to present a subset of a collection of data on a first grid having a first axis and a second axis (304). See, for example, grid 508 in FIG. 5. The first axis corresponds to units of time, and the collection of data includes data representing time-bounded events. Examples of time-bounded events are television programs, movies (e.g., movies broadcast by television signal, satellite or cable), and sporting events (e.g., sporting events broadcast by television signal, satellite or cable) that have a scheduled start time and duration. A second operation is to present a second grid having first and second axes that correspond to the first and second axes of the first grid (306). The second grid corresponds to a larger portion of the collection of data than the subset that is presented on the first grid. In other words, the second grid represents a larger portion of the collection of data. See, for example, grid 518, in FIG. 5. However, even the second grid may display a subset of the collection. A third operation is to present a user-movable window for selecting a portion of the second grid and for selecting the subset presented on the first grid in accordance with a current position of the window (308).

In some embodiments, if a landing page is already opened or if search results are already presented (e.g., in a search results page), the process 300 may begin by a user-initiated movement of the movable window in the second grid, or a new user-initiated search (310). The user-movable window is within the second grid and movable in any planar direction within the second grid. As the user-movable window is moved within the second grid, the events being displayed on the first grid change accordingly. In other words, the portion that is contained within the user-movable window of the second grid is displayed (e.g., in more detail) on the first grid in a larger view.

FIG. 4A is a schematic screenshot 400A of the display (i.e., user interface) produced by a web browser presenting search results according to one embodiment of the present invention. The user interface 400A can be produced by any type of browser (e.g., a web browser) that permits a user to display and interact with web pages or other documents or information. The user interface 400A includes a URL field 402 for entering the URL of any web page that a user wants to display, as well as for displaying the URL of the web page currently being displayed. As illustrated in this figure, the user interface 400A displays an exemplary web page 404. Web page 404 includes a search field 406 with a corresponding search button 408 for initiating a search for information corresponding to the search query in the search field 406.

When a user enters a search query in the search field 406 and selects the corresponding search button 408 to initiate a search, the web browser (i.e., the user interface 400A of the web browser) presents first results 410A and second results 412A. In some embodiments, the first results 410A include items 416A corresponding to one or more time-bounded events that match the search query and also include television event link 414A. In some embodiments, the time-bounded events items 416A of the first results 410A correspond to a respective television program and the first results 410A include at least one scheduled occurrence of the respective television program. For example, as shown in FIG. 4A, the time-bounded events items of the first results 410A include items 416A representing scheduled showings of "The Simpsons."

In some embodiments, a respective time-bounded event item 416A may include a link 418A to an online application for accessing additional information about the time-bounded event. Similarly, television event link 414A may be also link to the same online application for accessing additional information. The additional information may include additional search results, and/or may include additional information about the one or more time-bounded events. In these embodiments, the links 418A in items 416A are for accessing additional information for the time-bounded events, beyond what is shown in the first set of search results 410A. In some embodiments, the additional information may include additional time-bounded events, including title, schedule information and television channel information (or Internet location invention in the case on content or events not transmitted on television channels). In some other embodiments, the additional information is presented in a grid having a first axis corresponding to units of time and a second axis. In these embodiments, when a user selects the television links 414A or 418A, process 300 is initiated and the web browser may display an online application such as the one shown in FIG. 5.

In some embodiments, as shown in FIG. 4A, the time-bounded events of the first results 410A correspond to a respective television program and the first results 410A include at least one scheduled occurrence of the respective television program. The first results 410A may also include a DVR link 422A, where, upon user selection of the DVR link 422A, a request is sent to record the respective time-bounded event of the first results 410A on a digital video recorder (DVR) associated with the user. In some embodiments, first results 410A may also include a calendar link 424A, where, upon user selection of the calendar link 424A, the respective time-bounded event is added to a calendar associated with the user.

In some embodiments, the first results 410A correspond to a geographic location and a television show provider associated with a user of the online application. For example, the identity of the geographic location (e.g., a postal code or city name) and the television show provider (e.g., the cable television provider or satellite television provider) may be stored in a user profile (associated with the user who submitted the search query), which may be stored in a server that provides the aforementioned online application.

In some embodiments, the first results 410A are presented in a contiguous sub-region (e.g., the previously mentioned OneBox) of the web browser window and presented in manner that is visually distinguished from the second results. In some embodiments, the first results 410A and second results 412A are displayed in a list where the first results 410 are displayed above the second results 412A on the list.

In some embodiments, the second results 412A include web links 418A and additional information 420A. The second results 412A correspond to Internet accessible documents that satisfy the search query, and include web links 422A to the Internet accessible documents that satisfy the search query. The second results 412A also include additional information 420A. The additional information 420A may be a description of the Internet accessible document, a snippet of text from the Internet accessible document (e.g., text that includes one or more of the query terms), the web address of the Internet accessible document, or a combination of such items.

In some embodiments, the online application sends information to the client and the client processes the additional information for presentation. In some embodiments, the online application is executed, in part, on a client.

Figure 4B:
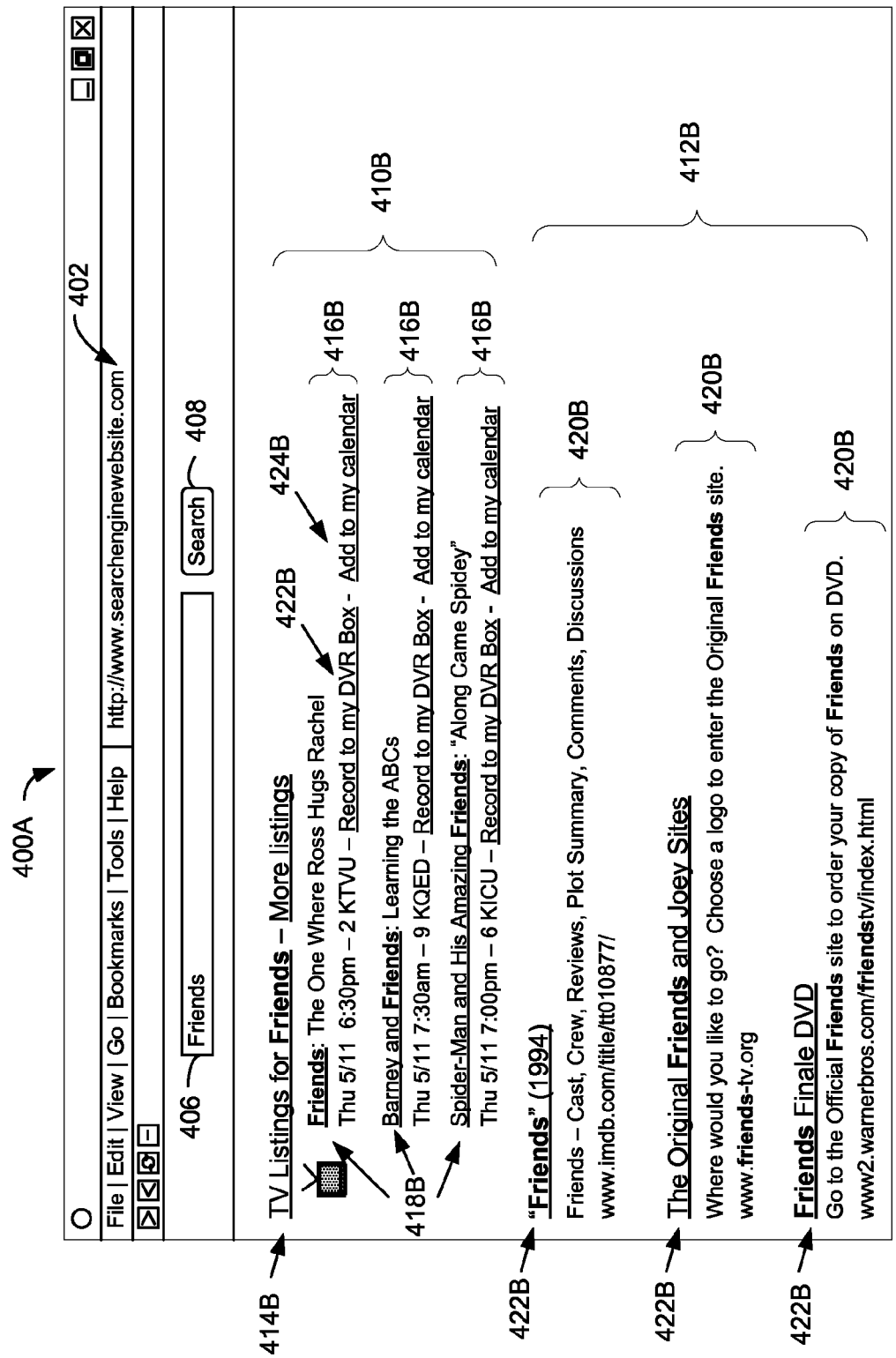
FIG. 4B is a schematic screenshot of a web browser presenting search results according to another embodiment of the present invention.

FIG. 4B is a schematic screenshot 400b of the display (i.e., user interface) produced by a web browser presenting search results according to another embodiment of the present invention. Similar to the user interface of FIG. 4A, user interface 400B can be produced by any type of browser (e.g., a web browser) that permits a user to display and interact with web pages or other documents or information. The user interface 400B includes a URL field 402 for entering the URL of any web page that a user wants to display, as well as for displaying the URL of the web page currently being displayed. As illustrated in this figure, the user interface 400B displays an exemplary web page 404B. Web page 404B includes a search field 406 with a corresponding search button 408 for initiating a search for information corresponding to the search query in the search field 406.

When a user enters a search query in the search field 406 and selects the corresponding search button 408 to initiate a search, the web browser 400B presents first results 410B and second results 412B. In some embodiments, the first results 410B correspond to one or more time-bounded events (represented by search result items 416B) that match the search query and include television event link 414B. In some embodiments, the first results 410B include one or more television program titles, where the television program titles include a word matching a word of the first search query. For example, as shown in FIG. 4B, the television program titles of the first results 410B contain the word "Friends," which was the search query that was entered into the search field 406.

Similar to web browser 400A, the time-bounded event link 418B may be a link to an online application for accessing additional information about the one or more time-bounded events. Similarly, television event link 414B may be also link to the same online application for accessing additional information about the one or more time-bounded events. In these embodiments, the links 418B are for accessing additional information for the time-bounded events. In some embodiments, the additional information may include schedule information and television channel information for the displayed events. In some other embodiments, the additional information is presented (see, for example, FIG. 5) in a grid having a first axis corresponding to units of time and a second axis. In these embodiments, when a user selects the television links 414B or 418B, process 300 is initiated and the web browser may display an online application such as the one shown in FIG. 5.

Figure 5:
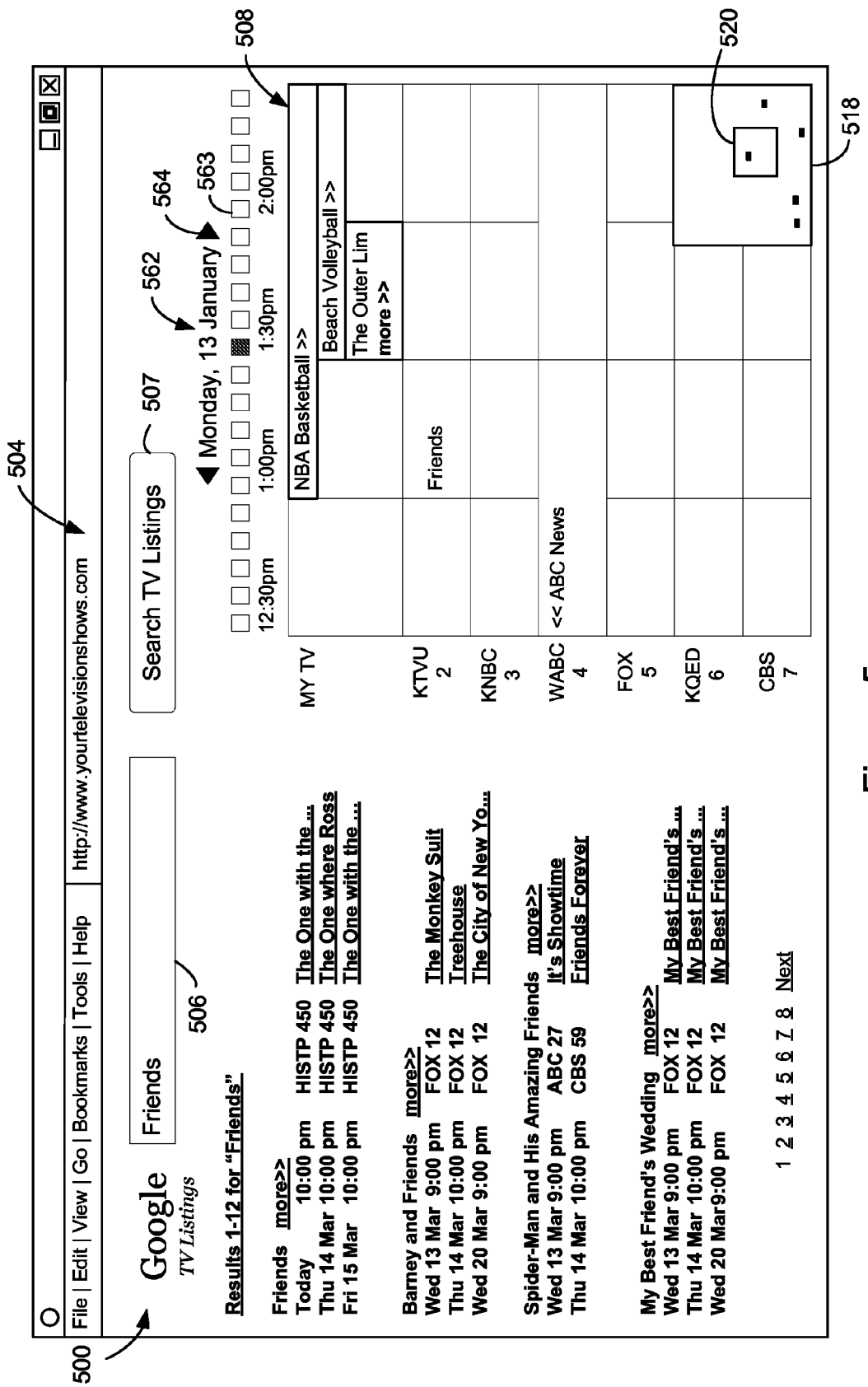
FIG. 5 is a schematic screenshot of a web browser presenting a collection of data according to another embodiment of the present invention.

FIG. 5 is a schematic screenshot of the display (i.e., user interface) produced by a web browser, including a webpage 500 presenting a schedule of time-bounded events or collection of data according to an embodiment of the present invention. According to this embodiment, the user interface of the web browser includes many of the same items as seen in the earlier figures, such as a URL field 504. The webpage 500 includes a search field 506 with a corresponding search button 507, a main map 508, and a results panel 510. The webpage 500 may also contain a MiniMap 518. In some embodiments, the webpage 500 may also include a time bar 562. The time bar 562 may be used to navigate to various times of the day by selecting a respective box 563 within the time bar 562 or by selecting one of the arrows 564 within the time bar 562. In some embodiments, the boxes 563 and arrows 564 may be represented by any other symbol or shape.

Figure 6:
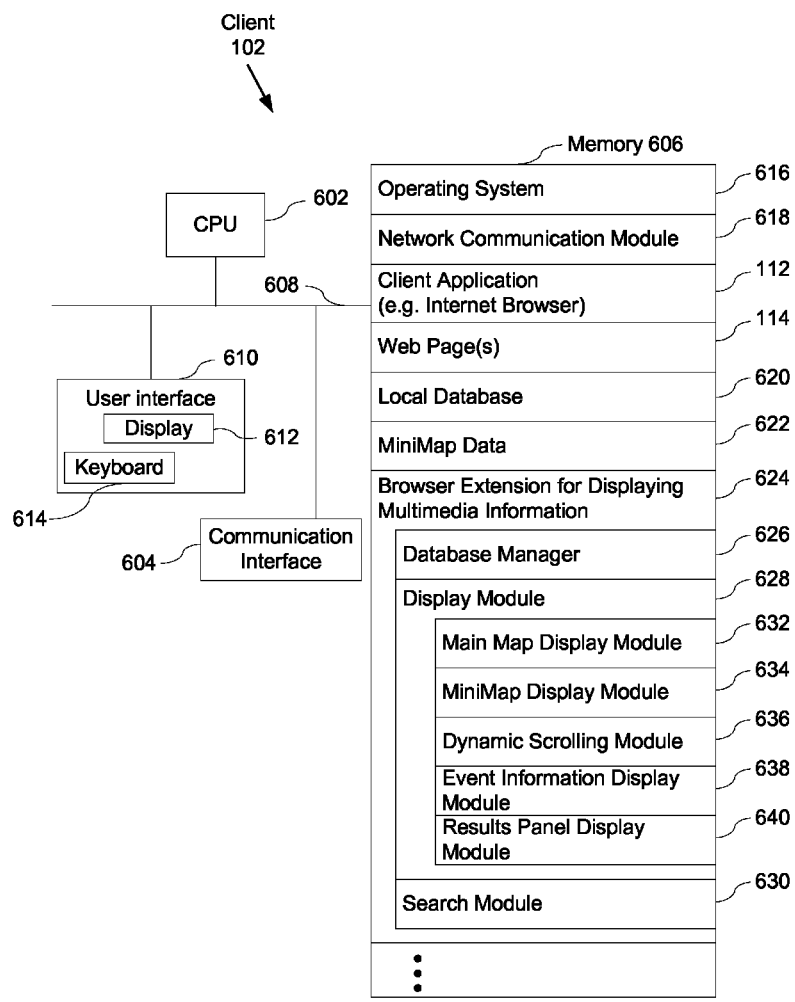
FIG. 6 is a block diagram of an exemplary client computer or device in accordance with some embodiments of the present invention.

FIG. 6 is a block diagram of an exemplary client computer or device in accordance with some embodiments of the present invention. The client 102 typically includes one or more processing units (CPUs) 602, one or more network or other communications interfaces 604, memory 606, and one or more communication buses 608 for interconnecting these components. The communication buses 608 may include circuitry (sometimes called a chipset) that interconnects and controls communications between system components. The client 102 optionally may include a user interface 610 comprising a display device 612 and a keyboard 614. Memory 606 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 606 may optionally include one or more storage devices remotely located from the CPU(s) 602. In some embodiments, memory 606 stores the following programs, modules and data structures, or a subset thereof:

- an operating system 616 that includes procedures for handling various basic system services and for performing hardware dependent tasks;
- a network communication module 618 that is used for connecting the client 102 to other computers via the one or more communication network interfaces 604 and one or more communication networks, such as the Internet, other wide area networks, local area networks, metropolitan area networks, and so on;
- a client application 112 (e.g., a browser application) that can permit a user to interact with the client 102 as described above;
- one or more web pages 114 that may be displayed by the client application 112;
- a local database 620 for storing information, such as multimedia information;
- MiniMap data 622; and
- a browser extension for displaying multimedia information 624.

In some embodiments, the browser extension for displaying multimedia information 624 includes a database manager 626, a display module 628 and a search module 630. The database manager 626 handles information being stored in the local database 620. The search module 630 is for conveying a search query entered by a user to search engine or other online service, such as the server 106 described elsewhere in this document.

The display module 628 facilitates the display of information on two grids, a main grid and a MiniMap grid, as described above. The display module 628 may also facilitate the display of information (e.g., search results) in a results panel. In some embodiments, the display module includes a main map display module 632, a MiniMap display module 634, a dynamic scrolling module 636, an event information display module 638, and a results panel display module 640.

The main map display module 632 and the MiniMap display module 634 determine how the main map and MiniMap are displayed on the web page. The dynamic scrolling module 636 controls the function of the dynamic scrolling feature 520 of the MiniMap 518. The event information display module 638 enables the display of information when a user selects an event that is displayed on the main map. The results panel display module 640 displays the results of a search query.

Figure 7A:
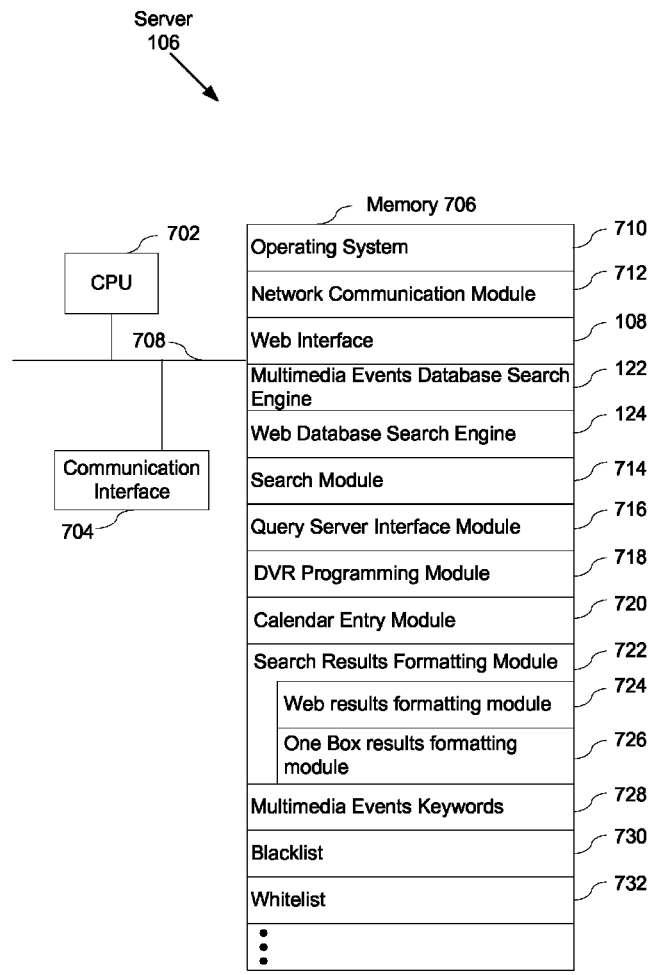
FIG. 7A is a block diagram of an exemplary server in accordance with some embodiments of the present invention.

FIG. 7A is a block diagram of an exemplary server 106 in accordance with some embodiments of the present invention. The server 106 typically includes one or more processing units (CPUs) 702, one or more network or other communication interfaces 704, memory 706, and one or more communication buses 708 for interconnecting these components. The communication buses 708 may include circuitry (sometimes called a chipset) that interconnects and controls communications between system components. The server 106 optionally may include a user interface (not shown). Memory 706 includes high speed random access memory, such as DRAM, SRAM, DDR RAM or other random access solid state storage devices; and may include non-volatile memory, such as one or more magnetic disk storage devices, optical disk storage devices, flash memory devices, or other non-volatile solid state storage devices. Memory 706 may optionally include one or more storage devices remotely located from the CPU(s) 702. In some embodiments, memory 706 stores the following programs, modules, data structures, or a subset thereof:
- an operating system 710 that includes procedures for handling various basic system services and for performing hardware dependant tasks;
- a network communication module 712 that is used for connecting the server 106 to other computers via the one or more communication network interfaces 504 and one or more communication networks, such as the Internet, other wide are networks, local area networks, metropolitan area networks, and so on;
- a web interface 108;
- a multimedia events database search engine 122;
- a web search engine 124;
- a search module 714;
- a query server interface module 716;
- a DVR programming module 718;
- a calendar entry module 720;
- a search results formatting module 722 that includes a web results formatting module 724 and a One Box results formatting module 726;
- one or more multimedia events keywords databases 728 for storing multimedia events keywords;
- one or more Blacklist databases 730 for storing Blacklist words and phrases; and
- one or more Whitelist databases 732 for storing Whitelist words or phrases.

As described above, the web interface 108 facilitates communication between the server 106 and the communication network 104 and allows for the transfer of information from the server 106 to the communication network 104 to be displayed on a client application 112 of a client 102. The multimedia events database search engine 122 is for conducting searches of the multimedia events database. The web database search engine 124 is for conducting searches of the web database. The server 106 may also comprise a search module 714 for conducting searches of the web database 126 and/or the multimedia events database 110.

In some embodiments, memory 706 includes a query server interface 716. The query server interface 716 receives queries from another server, such as a query server, and returns search results to that other server. For instance, a query server may direct a search query from a user to multiple search engines or databases, such as multimedia events database search engine 122 (or multimedia events database 110) and web database search engine 124 (or web database 126), and then send search results from one or more of those search engines or databases to the user.

Memory 706 may also include a DVR programming module 718 and/or a calendar entry module 720. The DVR programming module 718 allows for requests to be sent to a user's DVR to record a respective time-bounded event. As shown in FIGS. 4A and 4B, and as described above, when user selects the DVR link 422A or 422B, the request to record a respective time-bounded event is sent to a DVR associated with the user. The calendar entry module 720 allows for a respective time-bounded event to be added to a calendar associated with the user. As described above with reference to FIGS. 4A and 4B, when a user selects the calendar link 424A or 424B, a respective time-bounded event may be added to a calendar associated with the user.

Memory 706 may also include a search results formatting module 722. The search results formatting module 722 formats the results of a search query into first results and second results and includes a web results formatting module 724 (for formatting search results from the web database search engine 122 for presentation to a user) and a One Box results formatting module 726 (for formatting search results from the multimedia events database search engine 122 for presentation to the user).

Figure 7B:
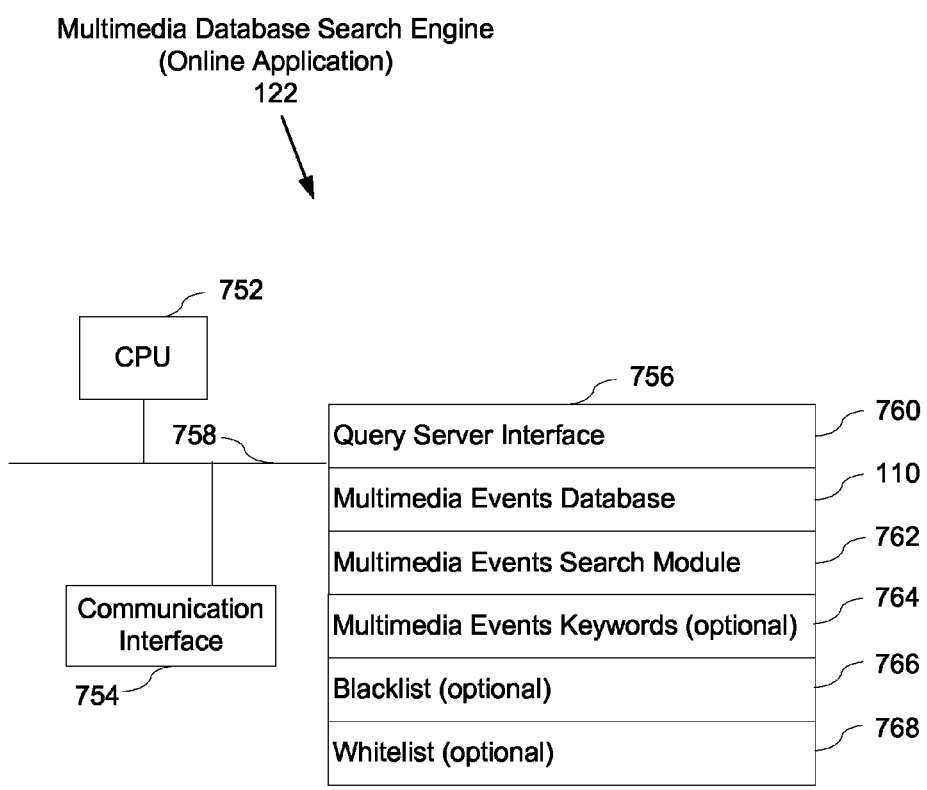
FIG. 7B is a block diagram of an exemplary multimedia events database search engine in accordance with some embodiments of the present invention.

FIG. 7B is a block diagram of multimedia events database search engine 122 in accordance with some embodiments of the present invention. The multimedia events database search engine 122 typically includes one or more processing units (CPUs) 752, one or more network or other communication interfaces 754, memory 756, and one or more communication buses 758 for interconnecting these components. The communication buses 758 may include circuitry (sometimes called a chipset) that interconnects and controls communications between system components. The multimedia events database search engine 122 optionally may include a user interface (not shown). Memory 756 includes high speed random access memory, such as DRAM, SRAM, DDR RAM or other random access solid state storage devices; and may include non-volatile memory, such as one or more magnetic disk storage devices, optical disk storage devices, flash memory devices, or other non-volatile solid state storage devices. Memory 756 may optionally include one or more storage devices remotely located from the CPU(s) 752. In some embodiments, memory 756 stores the following programs, modules, data structures, or a subset thereof:
- query server interface 760 for receiving queries from another server, such as a query server 120 (FIG. 1), and returning search results to that other server;
- a multimedia events database 110 for storing information related to multimedia events; and
- a search module 762 for conducting searches of the multimedia events database 110.

In some embodiments, memory 756 may optionally include one or more multimedia events keywords databases 764, one or more Blacklist databases 766, and one or more Whitelist databases 768.

Each of the above identified elements in FIGS. 6, 7A and 7B may be stored in one or more of the previously mentioned memory devices, and corresponds to a set of instructions for performing a function described above. The above-identified modules or programs (i.e., sets of instructions) need not be implemented as separate software programs, procedures or modules, and thus various subsets of these modules may be combined or otherwise rearranged in various embodiments. In some embodiments, memory 606, 706, and 756 may sore a subset of the modules and data structures identified above. Furthermore memory 606, 706 and 756 may store additional modules and data structures not described above.

Although FIGS. 6, 7A and 7B show respectively a client 102, a server 106, and a multimedia events database search engine 122 the figures are intended more as functional descriptions of the various features which may be present in a client and set of servers than as a structural schematic of the embodiments therein. In practice, and as recognized by those of ordinary skill in the art, items shown separately could be combined and come items could be separated. For example, some items shown separately in FIG. 7A could be implemented on a single server and single items could be implemented by one or more servers. The actual number of servers used to implement a server 106 and how features are allocated among them will vary from one implementation to another, and may depend in part on the amount of data traffic that the system must handle during peak usage periods as well as during average usage periods.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, comprising:
   at a computing device having one or more processors and memory storing one or more programs executed by the one or more processors to perform the method, performing the operations of:
   responsive to a user search query for one or more electronic documents, wherein the user search query includes a search keyword
   (A) obtaining a first set of time-bounded event results in accordance with a determination that the search keyword corresponds to one or more time-bounded events scheduled for showing on one or more television channels, including:
      invoking a first search query having the search keyword against a time-bounded event database, wherein the first set of time-bounded event results corresponds to the one or more time-bounded events; and
   (B) obtaining a second set of electronic document results, including:
      independent from invoking the first search query, invoking using a web search engine a second search query having the search keyword against an electronic document database distinct and separate from the time-bounded event database, wherein the second set of results corresponds to Internet accessible documents that satisfy the second search query; and
   presenting concurrently
   (i) the first set of time-bounded event results,
   (ii) the second set of electronic document results, in a single web browser window, including:
      presenting the first set of time-bounded event results in a contiguous sub-region of the web browser window and
      presenting the first set of time-bounded event results in manner that is visually distinguished from the second set of electronic document results, and
   (iii) in the contiguous sub-region of the web browser window in which the first set of time-bounded event results is displayed, a user-selectable option enabling a user to record a respective time-bounded event of the first set of time-bounded event results on a media content recording device.

2. The method of claim 1, wherein the second set of electronic document results is displayed in a second region of the web browser window that excludes the contiguous sub-region of the web browser window in which the first set of time-bounded event results is displayed.

3. The method of claim 2, wherein the first and second sets of results are displayed in a list, and wherein the first set of time-bounded event results are displayed above the second set of electronic document results on the list.

4. The method of claim 1, further comprising:
   presenting concurrently with the (i) the first set of time-bounded event results, and (ii) the second set of electronic document results,
   (iii) an option enabling a user to add a calendar reminder corresponding to an time-bounded event in the one or more time-bounded events.

5. The method of claim 1, further comprising:
   presenting scheduling information for a respective time-bounded events in the one or more time-bounded events in a grid having a first axis corresponding to units of time and a second axis.

6. The method of claim 1, wherein the first set of time-bounded event results is selected in accordance with a geographic location and a television showings provider associated with a user.

7. The method of claim 1, wherein (i) the first set of time-bounded event results is obtained automatically without user intervention, responsive to the user search query for the one or more electronic documents.

8. The method of claim 6, wherein the first set of time-bounded event results includes one or more television program titles comprising a word matching the search keyword.

9. A system for presenting search results, comprising:
   memory;
   one or more processors; and
   one or more programs stored in the memory and configured for execution by the one or more processors, the one or more programs comprising instructions for:
   responsive to a user search query for one or more electronic documents, wherein the user search query includes a search keyword
   (A) obtaining a first set of time-bounded event results in accordance with a determination that the search keyword corresponds to one or more time-bounded events scheduled for showing on one or more television channels, including:
      invoking a first search query having the search keyword against a time-bounded event database, wherein the first set of results corresponds to the one or more time-bounded events; and
   (B) obtaining a second set of electronic document results, including:
      independent from invoking the first search query, invoking using a web search engine a second search query having the search keyword against an electronic document database distinct and separate from the time-bounded event database, wherein the second set of results corresponds to Internet accessible documents that satisfy the second search query; and presenting concurrently
(i) the first set of time-bounded event results,
(ii) the second set of electronic document results, in a single web browser window, including:
presenting the first set of time-bounded event results in a contiguous sub-region of the web browser window and
presenting the first set of time-bounded event results in manner that is visually distinguished from the second set of electronic document results, and
(iii) in the contiguous sub-region of the web browser window in which the first set of time-bounded event results is displayed, a user-selectable option enabling a user to record a respective time-bounded event of the first set of time-bounded event results on a media content recording device.

10. A non-transitory computer readable storage medium that stores one or more programs, the one or more programs comprising instructions for:
responsive to a user search query for one or more electronic documents, wherein the user search query includes a search keyword
(A) obtaining a first set of time-bounded event results in accordance with a determination that the search keyword corresponds to one or more time-bounded events scheduled for showing on one or more television channels, including:
invoking a first search query having the search keyword against a time-bounded event database, wherein the first set of results corresponds to the one or more time-bounded events; and
(B) obtaining a second set of electronic document results, including:
independent from invoking the first search query, invoking using a web search engine a second search query having the search keyword against an electronic document database distinct and separate from the time-bounded event database, wherein the second set of results corresponds to Internet accessible documents that satisfy the second search query; and
presenting concurrently
(i) the first set of time-bounded event results,
(ii) the second set of electronic document results, in a single web browser window, including:
presenting the first set of time-bounded event results in a contiguous sub-region of the web browser window and
presenting the first set of time-bounded event results in manner that is visually distinguished from the second set of electronic document results, and
(iii) in the contiguous sub-region of the web browser window in which the first set of time-bounded event results is displayed, a user-selectable option enabling a user to record a respective time-bounded event of the first set of time-bounded event results on a media content recording device.

* * * * *

UNITED STATES PATENT AND TRADEMARK OFFICE
CERTIFICATE OF CORRECTION

Page 1 of 1

PATENT NO.         : 9,084,025 B1
APPLICATION NO.    : 11/834655
DATED              : July 14, 2015
INVENTOR(S)        : Gossweiler, III et al.

It is certified that error appears in the above-identified patent and that said Letters Patent is hereby corrected as shown below:

In the Claims

At Claim 4, column 14, line 21, please delete "to an time-bounded event" and insert -- to a time-bounded event --;

At Claim 5, column 14, line 25, please delete "bounded events in" and insert -- bounded event in --.

Signed and Sealed this
Twelfth Day of April, 2016

Michelle K. Lee
*Director of the United States Patent and Trademark Office*